(12) United States Patent
Rausenberger (10) Patent No.: US 7,930,454 B2
(45) Date of Patent: Apr. 19, 2011

(54) THIN-CLIENT TERMINAL AND CLIENT/SERVER-SYSTEM HAVING SUCH A TERMINAL

(76) Inventor: Achim Rausenberger, Öhringen (DE)

( * ) Notice: Subject to any disclaimer, the term of this patent is extended or adjusted under 35 U.S.C. 154(b) by 263 days.

(21) Appl. No.: 11/918,028

(22) PCT Filed: Sep. 17, 2005

(86) PCT No.: PCT/DE2005/001638
§ 371 (c)(1),
(2), (4) Date: Jun. 23, 2008

(87) PCT Pub. No.: WO2006/105743
PCT Pub. Date: Oct. 12, 2006

(65) Prior Publication Data
US 2008/0285212 A1    Nov. 20, 2008

(30) Foreign Application Priority Data
Apr. 8, 2005    (DE) .................. 20 2005 005 702 U (51) Int. Cl.
*G06F 13/00* (2006.01)
(52) U.S. Cl. ............... 710/100; 361/679.08; 361/679.21
(58) Field of Classification Search .................. 710/100, 710/300, 305; 361/679.01–679.02, 679.08, 361/679.21
See application file for complete search history.

(56) References Cited

U.S. PATENT DOCUMENTS 4,410,949 A * 10/1983 Huellinghorst et al. ...... 705/413
4,847,602 A * 7/1989 Altland et al. ........... 361/679.21
(Continued)

FOREIGN PATENT DOCUMENTS
DE    3914928    11/1989
JP    2002319770 A * 10/2002
(Continued)

OTHER PUBLICATIONS

JP 2002319770 A (JINNAI) Abstract (English translation from Foreign Patent Documents).*
(Continued)

*Primary Examiner* — Clifford H Knoll
(74) *Attorney, Agent, or Firm* — Horst M. Kasper (57) ABSTRACT

A thin-client terminal (1,1') according to the invention serves for use in a potentially explosive area (ExB) and has at least the following components: an EDP device (11,11'), which can be programmed using software, has graphics capabilities, has its own storage and computation capacity, is connected, via at least one data transmission channel (K), to a computer (C)—which is not arranged in the potentially explosive area (ExB) and acts as a server—and is capable of communicating with the latter as a thin client in accordance with the client/server principle, and a display (12) which is connected to the EDP device (11, 11') and is intended to display data. The thin-client terminal (1,1') according to the invention is explosion-proof or is intrinsically safe and can thus be used in the potentially explosive area (ExB). The thin-client terminal (1,1') also preferably has an explosion-proof or intrinsically safe keyboard (13) which is connected to the EDP device (11,11') and is intended for inputting data.

21 Claims, 2 Drawing Sheets

U.S. PATENT DOCUMENTS

| | | | |
|---|---|---|---|
| 6,839,790 B2* | 1/2005 | Barros De Almeida et al. | 710/305 |
| 2002/0135989 A1* | 9/2002 | Preston et al. | 361/757 |
| 2004/0027792 A1* | 2/2004 | Newman | 361/679 |
| 2005/0114086 A1* | 5/2005 | Zielinski et al. | 702/184 |
| 2010/0042258 A1* | 2/2010 | Perlin et al. | 700/258 |

FOREIGN PATENT DOCUMENTS

JP      2002342705 A   * 11/2002

OTHER PUBLICATIONS

JP 2002342705 A (HYODO) Abstract (English translation from Foreign Patent Documents).*

Thomas Net: "Industrial Thin Client Is Suited For Marsh Environment" Internet Article—New Story—XP00238 of Feb. 15, 2005.

Arista: "MMI Express"—Internet Article, XP002381872 of May 19, 2006.

"Survivor-CIO", Product Specifications, XP002381944 of Jul. 2004.

* cited by examiner

THIN-CLIENT TERMINAL AND CLIENT/SERVER-SYSTEM HAVING SUCH A TERMINAL

FIELD OF THE INVENTION

The invention relates to a thin-client terminal that has a programmable data processing device having graphics capabilities and having its own storage and computing capacity, and also to a client-server system having at least one such terminal.

DESCRIPTION OF RELATED ART

The term thin client designates a data processing application or a computer as the terminal of a network whose functional configuration is limited to input and output. Consequently, the thin client is situated between the concept of a fat client and that of an ultra-thin client. The thin client can obtain its data and its application programs entirely from a server. The thin client itself is not equipped with a hard drive, whereby especially its computing capacity is relatively small. Thus, the thin client is conceptually the return of the terminal into the computer environment which nowadays is so often PC-based. In particular, the thin client can be equipped with a relatively slow processor with little RAM and an integrated graphics card for an extremely minimalist workplace. The clock frequency of thin clients is typically less than 1 GHz.

The thin client is set up in such a way that it only displays the output of the started programs, whereby the programs are started and executed on the server. The inputs from the mouse and keyboard are sent from the thin client via a protocol to the server which, in turn, sends the output of the programs back to the thin client so that only the output, but not the execution of these programs, takes place on the thin client.

As a rule, computer support is needed for work performed in potentially explosive areas (referred to as "explosive areas" below), for example, to operate, control or monitor processes being carried out there. For example, measurements can be taken in explosive areas by means of sensors, whereby these measurements are to be evaluated by a computer and then shown on a display or depicted graphically for a person working in the explosive area. In many cases, these persons have to be able to make inputs into the computer, for example, by means of a keyboard or a mouse, in response to the displayed data.

The operation of electric and electronic devices in an explosive area, however, is problematic because of the risk of explosion and is not permitted without special protective measures; this is subject to special stipulations that also regulate the approval of devices protected in this manner for use in explosive areas.

These protective measures are very complex and thus expensive. Moreover, the protective effort needed to implement the explosion protection or the intrinsic safety of a device quickly increases as the electric power of the device rises.

For this reason, it is common in such cases to set up a computer outside of the explosive area in the so-called "safe area" and to create an explosion-protected or intrinsically safe design only for those components that absolutely have to be located in the explosive area, such as, for example, the display, the keyboard, the mouse or the terminal, and to place them in the explosive area, whereby they are connected by means of long lines to the computer that is situated outside of the explosive area. In this manner, the electric power dissipated inside the explosive area is kept as low as possible.

However, the data flow that is generated in this manner between the explosive area and the safe area is often quite extensive. This is especially the case when the computer computes complicated, high-resolution realtime graphics from the measured values that are supplied by the sensors located in the explosive area and sends these graphics to the display so that they are available in real time to the person working in the explosive area.

In actual practice, the data volume that has to be transmitted per unit of time, especially in real-time operation, via the lines from the computer to the monitor often reaches such large proportions—a typical data transmission rate is, for example, 1 to 4 gigabits/s—that lines with a wide bandwidth such as, for example, optical cables, have to be used for the transmission.

The converters, couplers, multiplexers, demultiplexers, and, optionally, amplifiers, etc., necessary for this purpose, in turn, cause power losses and, if they are located in the explosive area, have to be configured so as to be explosion-protected or intrinsically safe, as a result of which the complexity and the costs rise even further. By the same token, this calls for the lines leading out of the explosive area and into the safe area to be absolutely tightly sealed, which further increases the complexity; this complexity also increases as the data flow rises.

The requisite cabling effort is considerable. The above-mentioned problem is even greater when dealing with large distances between the components located in the explosive area and the computer located in the safe area which, in actual practice, for example, in mining, can often be more than 50 meters, in some cases even more than 500 meters. This can apply in an identical manner to the lines for connecting the sensors distributed throughout the explosive area to the computer.

As a result, an enormous amount of effort is required for the cabling and data transmission. Consequently, the spatial separation between the computer on the one hand and the display and input components on the other hand, which is undertaken in order to reduce the electric power dissipated within the explosive area, is associated in actual practice with substantial drawbacks that result in high costs.

Nowadays, a remote control approach is normally used in order to operate a high-performance PC in an explosive area. The PC itself is completely located in the safe area, and only the display and the keyboard/mouse are located in the explosive area. The image transmission into the explosive area takes place over typical distances of up to 750 meters at a very wide broadband in an analog or digital mode via a multi-strand copper cable or digitally via a single-strand optical cable. The transmission of the keystrokes and of the mouse movement out of the explosive area is carried out at a small bandwidth. The wide bandwidth during the image transmission calls for relatively complicated transmission and installation technology, which makes it expensive and sensitive.

Technical Objective

Therefore, the invention is based on the objective of avoiding or at least considerably reducing the above-mentioned drawbacks.

This objective is achieved according to the invention by a thin client terminal for use in an explosive area, having
 a data processing device having graphics capabilities that can be programmed by means of software and having its own storage and computing capacity, said device being connected via at least one data transmission channel to a computer that is not located in the explosive area and that functions as a server, said device, as the thin client, being capable of communicating with the computer according to the client-server principle, and a display connected to the data processing device for purposes of displaying data, whereby the thin client terminal is configured to be explosion-protected or intrinsically safe so that it can be used in the explosive area.

Here, compressed data is transmitted via the data transmission channel in at least one direction, that is to say, the communication via the data transmission channel consists of the transmission of compressed data in at least one direction, preferably in both directions. The thin client terminal according to the invention is thus capable of receiving compressed data from the computer via the data transmission channel and/or of sending compressed data to the computer. Moreover, at least some of the data undergoes computing operations in the data processing device. The data that goes to the data processing device is changed there according to the invention, at least partially.

A2 The thin client terminal preferably also has a keyboard that is configured to be explosion-protected or intrinsically safe and that is connected to the data processing device for purposes of inputting data. A3 The thin client terminal can have a barcode reader that is configured so as to be explosion-protected or intrinsically safe and that is connected to the data processing device for purposes of inputting data. A4 The thin client terminal preferably has a mouse that is configured so as to be explosion-protected or intrinsically safe and that is connected to the data processing device for purposes of inputting data and/or it has at least one other pointing device, for example, a trackball, finger mouse or touchpad, that is configured so as to be explosion-protected or intrinsically safe and that is connected to the data processing device for purposes of inputting data. A5 The data processing device preferably has a microprocessor or a microcontroller. A6 In particular, the clock frequency of the microprocessor or microcontroller can be less than 5 gigahertz or less than 2 gigahertz or less than 1 gigahertz or less than 800 megahertz or less than 100 megahertz.

A7 The data processing device can have its own graphics processor. A8 The display is preferably a flat monitor that is configured so as to be explosion-protected or intrinsically safe. A9 The display can be a touch screen that is configured so as to be explosion-protected or intrinsically safe, via which data can be input into the data processing device.

A10 The data processing device preferably has at least one memory chip or other type of memory without a magnetic disk. Such memories are advantageous here since their energy consumption is low and since they have no rotating parts that could generate sparks.

A11 The entire thin client terminal can preferably be operated at a low voltage of 24 volts or less, for example, at a voltage of 24V or 12V or 5V. Preferably, it has no power pack for connection to the 230V power supply.

In the thin client terminal, preferably exclusively or mainly graphic data is processed and depicted on the display, whereby preferably all of the data that is to be depicted on the display—insofar as it is compressed data—is unpacked or decompressed directly by the data processing device and then output on the display, for example, without involving the computer or server for this purpose.

The program needed for processing data or generating graphics in the data processing device can be downloaded from the computer one time. During operation, for example, it is often provided that the data supplied by sensors that are distributed in the explosive area is processed in a certain manner and the results are displayed on the monitor in real time as a graphic, if applicable, as a function of inputs made via the keyboard, the mouse or the barcode reader. This graphic can depict, for example, the momentary status of a system that is running in the explosive area and can be, for instance, animated in order to facilitate the intuitive comprehension of the graphic content of a person who is operating or controlling the system.

In order to achieve this objective, in a conventional arrangement that is not according to the invention, all of the graphic information has to be generated by the computer and sent to the monitor. Especially at a high graphic resolution, great color depth and high time resolution, this calls for an extremely large data flow from the computer to the monitor.

Using the invention, however, it is possible to generate the graphic information in the data processing device from a compressed file supplied by the computer or from a relatively small volume of data supplied by the computer and, for example, to send it via a short parallel cable to the monitor. The requisite data flow from the computer or server to the thin client terminal is thus considerably reduced in a client-server system according to the invention.

After the data has been decompressed and/or processed and/or generated by the data processing device within the explosive area, said data, especially graphic data, can be depicted directly on the display, for example, without a further data transfer from or to the computer being necessary for this purpose.

Moreover, in the thin client terminal, at least part of the data can be processed that conventionally first has to be transferred to the computer and thus to outside of the explosive area so as to be processed there, as a result of which the data flow between the server and the thin client terminal is likewise reduced.

A12 Therefore, the data processing device preferably has at least one interface for the connection of a sensor so that a sensor arranged in the explosive area can be connected directly to the data processing device and thus the data supplied by the sensor does not first have to be transferred to outside of the explosive area. When sensors are operated within the explosive area, in this manner, the cabling effort and the data flow between the explosive area and the safe area are reduced even further.

One possibility is to carry out a data reduction in the data processing device within the explosive area, for example, by forming mean values from numerous individual values supplied by the sensors, and only to forward the thus-reduced data via the data transmission channel to the computer outside of the area.

By the same token, all inputs, for example, those made via the keyboard or the mouse, can be processed directly in the data processing device, without involving the computer for this purpose. By the same token, data can be stored or temporarily stored in a memory of the data processing device, without sending data to the computer in this process.

Preferably, the data transmitted via the data transmission channel consists at least partially of data that only relates to the change of an already existing status, for example, a certain screen layout. Therefore, such data does not contain the complete information for creating a certain status such as, for instance, a certain screen layout, but rather only the much less comprehensive information relating to a pure change or updating of the existing status. For example, if many numbers are displayed on the monitor that correspond to current sensor measured values, and if a few of these numbers change while all of the other numbers remain constant, then preferably only the changed number, that is to say, advantageously only a small data volume is transmitted; in addition, for example, the information "status otherwise retained without change" can be transmitted. In this manner, the display status of the monitor only changes with respect to this one number, whereas the display status remains otherwise unchanged.

Thus, by means of the invention, the data flow that has to be transmitted between the explosive area and the safe area is substantially reduced. In actual practice, a reduction of the data flow by a factor of 10,000 or more can easily be achieved by means of the invention. This allows a reduction of the transmission bandwidth between the thin client terminal and the computer and, in many cases, even allows the use of conventional wiring for the transmission of this data flow instead of coaxial or optical cables.

Preferably, the data processing device is configured to be as energy-saving as possible, so as to keep the power that is dissipated within the explosive area to a minimum. Therefore, preferably, all components that are not absolutely necessary to operate the data processing device are dispensed with. Moreover, the data processing device is preferably equipped with a CPU that only generates very little heat so that a CPU fan is not needed. Consequently, the use of a CPU with a low clock frequency, for example, of less than 1 GHz or even less than 100 MHz can be advantageous. The computing capacity is preferably selected to be as small as possible. Whenever possible, the power demand of the data processing device is less than 50 watts, preferably less than 10 watts, especially preferably less than 1 watt.

For the remote control, preferably the Windows-based technology of the Remote Desktop Protocol (RDP) is used. The typical application purpose for this is the remote maintenance of PCs via a network. Here, the client logs on to the server by entering an IP address and the person logging on authenticates himself with a USERNAME and PASSWORD. This technology can be used according to the invention for operating and remotely controlling the computer.

According to the invention, various technologies and application cases can be combined; for instance, the following possibilities exist:

the use of the RDP protocol or of the VNC protocol (virtual network computing network) instead of image transmission via broadband, the use in the industrial environment of the explosive area. For the thin client terminal in the explosive area, only a relatively small computing capacity is needed, which simplifies its approval for use in explosive areas. The "server" itself is in the safe area and is thus exempt from approval for use in explosive areas.

the use of a DSL connection as the transmission route. This offers a sufficient bandwidth for the RDP protocol and a sufficient range for the application (connection between the PC or computer in the safe area and the thin client terminal in the explosive area).

A13 The objective is also achieved by a client-server system with a server and at least one thin client connected to it, whereby the thin client is a thin client terminal according to the invention of the type described above for use in an explosive area and consequently can be used in an explosive area.

Thus, the thin client terminal according to the invention can be part of a client-server system according to the invention in which the computer functions as the server and the thin client terminal functions as the thin client. Here, the explosion-protected or intrinsically safe thin client terminal according to the invention can be the only client of the computer or server. As an alternative, several explosion-protected or intrinsically safe thin client terminals are connected to the server.

The computer or server does not have to be configured so as to be explosion-protected or intrinsically safe since it is not used in the potentially explosive area, also referred to as the "explosive area". In the simplest case, the data transmission channel consists merely of an incoming line and an outgoing line.

A14 Therefore, according to a preferred embodiment of the invention, the data transmission channel is a DSL or ISDN line or the data transmission channel has at least one asynchronous serial interface.

A15 On the basis of a variant of the client-server system according to the invention, the data transmission channel allows a maximum data trans-mission rate between 100 kilobits per second and 100 megabits per second, preferably 115,200 bits per second, or between 1 megabit and 8 megabits per second.

A16 On the basis of one embodiment of the client-server system according to the invention, several thin client terminals according to the invention of the type described above are connected to the server.

A17 According to an embodiment of the client-server system according to the invention, the data processing device receives a certain maximum volume of basic data per unit of time from the server, whereby said device generates a volume of graphic data from this per unit of time and transmits it to the display, said data, averaged over time, being more extensive than the volume of basic data received per unit of time by the data processing device from the server. Preferably, the volume of graphic data generated per unit of time and transmitted to the display averaged over time is more extensive by a factor of at least 10 than the volume of basic data received by the data processing device from the server.

A18 According to an embodiment of the client-server system according to the invention, the data processing device receives a certain maximum volume of raw data per unit of time from the keyboard and/or the mouse and/or the barcode reader and/or one or more sensors connected to the data processing device, whereby the device generates a volume of processed data from this per unit of time and transmits it to the server, said data volume being less extensive averaged over time, preferably less extensive by a factor of at least 10 averaged over time, than the volume of raw data received by the data processing device per unit of time.

A19 According to an advantageous variant of the client-server system according to the invention, the data processing device and the computer are capable of communicating in at least one direction by means of a multiplex signal, that is to say, via a composite signal to transmit two or more signals belonging to different logical channels via one single, physically shared channel. A multiplexer that serves to establish a multiplex signal reads in the signals belonging to the logical channels consecutively in a cyclical sequence and transmits them via the shared channel.

Brief description of the drawing in which the following is schematically shown.

Figure 1:
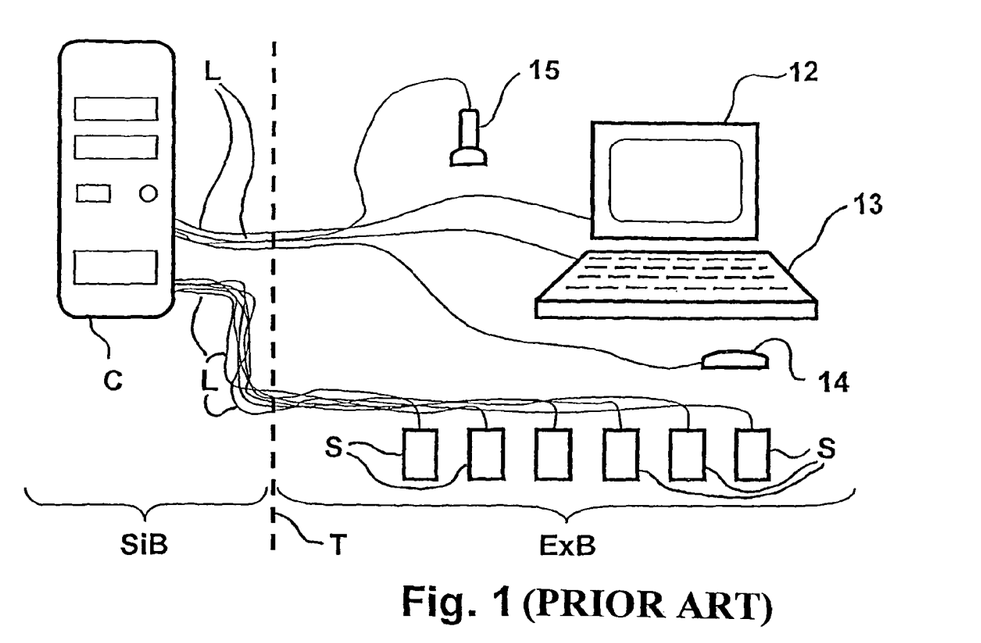
FIG. 1 in order to further illustrate the state of the art, a conventional arrangement with a monitor, a keyboard, a barcode reader, a mouse as well as software that are all located in an explosive area and that are connected in a conventional manner to a computer arranged outside of said area, FIG. 2 for further illustrating the state of the art, an arrangement that is modified in comparison to that of FIG. 1 in that the connection from the computer to the monitor, to the keyboard, to the barcode reader and to the mouse is established via two KVM ("keyboard-video-mouse") interfaces and via a multiplex connection, FIG. 3 a client-server system according to the invention having a thin client terminal with the monitor, the keyboard, the barcode reader and the mouse of FIG. 1, which are all connected to a data processing device arranged in the thin client terminal, said data processing device being connected to the computer of FIG. 1, and FIG. 4 a client-server system according to the invention having a thin client terminal with the monitor, the keyboard, the barcode reader and the mouse of FIG. 1, which are all connected to a data processing device arranged in the thin client terminal, whereby the sensors of FIG. 1 are additionally connected to said data processing device, which is connected to the computer of FIG. 1.

FIG. 1 serves to further illustrate the state of the art and shows a monitor 12, a keyboard 13, a barcode reader 15, a mouse 14 as well as six sensors S, which are all located in an explosive area that is at risk of explosion, for example, because of explosive gas or explosive dust, and which are connected in a conventional manner to a computer C arranged outside of said area.

The potentially explosive area, called explosive area ExB for short, is separated by a partition T from the non-explosive outside, which is designated here as the safe area SiB.

All of the components 12, 13, 14, 15, S located within the explosive area are configured in compliance with the regulations so as to be explosion-protected or intrinsically safe in accordance with a certain protection class since otherwise, they would not be permitted for use in the explosive area. All of the cited components are connected via likewise explosion-protected or intrinsically safe lines L to a computer C that is set up in the safe area SiB. Therefore, the cabling effort is considerable.

The sensors S continuously supply data to the computer C. Likewise, data input via the keyboard 13, the mouse 14 and the barcode reader 15 is transmitted to the computer C. The computer processes the incoming data and uses it to generate data or graphics that are displayed on the monitor 12 in real time, for example, in order to allow a person working in the explosive area to control or monitor processes taking place in the explosive area or to operate a system that is running in the explosive area.

In actual practice, especially during real time operations, the data volume to be transmitted per unit of time via the lines L from the explosive area to the computer C and from there back into the explosive area to the monitor often reaches very large proportions, namely, up to several gigabits per second, which is associated with considerable drawbacks and costs.

Figure 2:
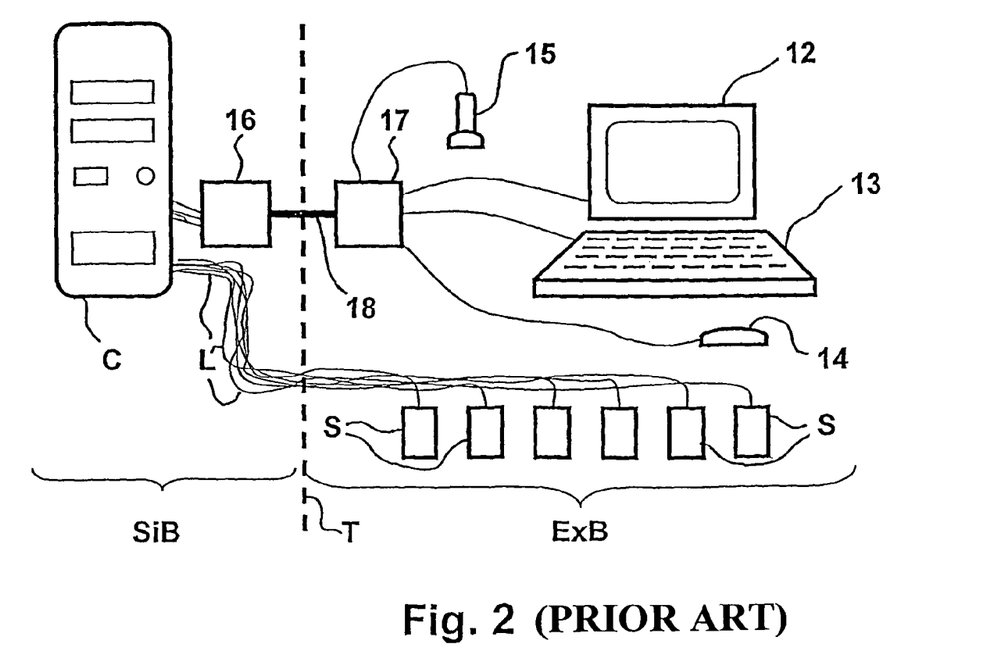

For further illustrating the state of the art, FIG. 2 shows an arrangement that is modified in comparison to that of FIG. 1 in that the connection from the computer C to the monitor 12, to the keyboard 13, to the barcode reader 15 and to the mouse 14 is established via two KVM interfaces 16, 17 and via a multiplex connection 18, whereby the abbreviation KVM stands for "keyboard-video-mouse". This connection serves exclusively to transmit data by means of the multiplex method, whereby, depending on the transmission direction, the KVM interface 16 functions as a multiplexer and the KVM interface 17 functions as a demultiplexer or vice versa. The data itself, especially the data content, data volume and data format, is not changed in this process; in particular, the data does not undergo any logical operations, no computing operations, no compression and no decompression in the KVM interfaces 16, 17. The KVM interfaces are neither intended for nor capable of operations that change the data or its format. The transmission via the multiplex connection 18 is a transmission via broadband.

Figure 3:
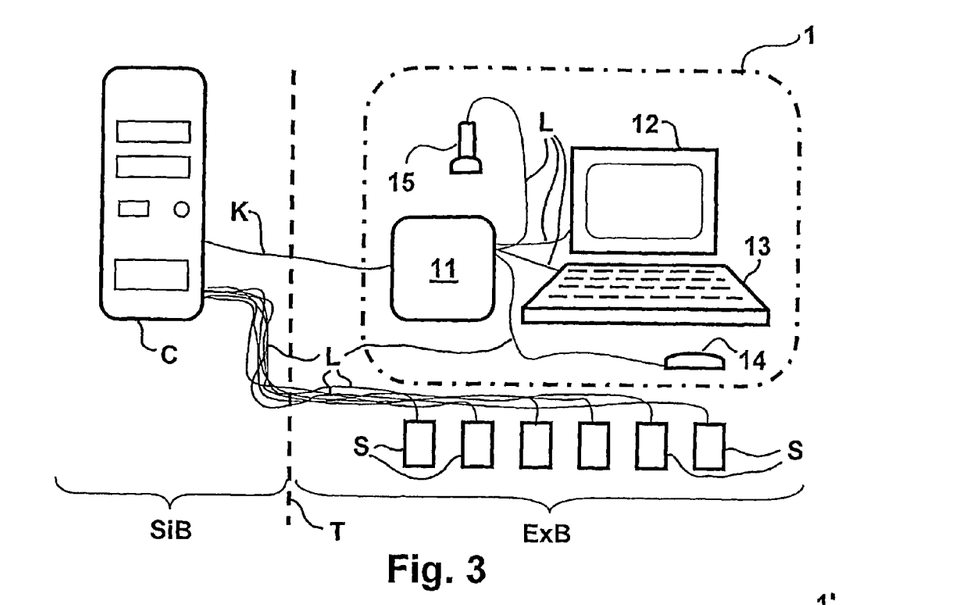

In an embodiment of the invention, FIG. 3 shows a thin client terminal 1 according to the invention, comprising the monitor 12, the keyboard 13, the mouse 14 and the barcode reader 15 of FIG. 1 and also a data processing device 11. In contrast to FIG. 1, according to the invention, the monitor 12, the keyboard 13, the mouse 14 and the barcode reader 15 are no longer connected directly to the computer C but rather to the data processing device 11 which has appropriate interfaces (not shown here).

According to the invention, the data processing device 11 can be programmed by means of software, it has graphics capabilities and has its own storage and computing capacity, and is consequently capable of processing incoming data. The memory units used for this preferably do not have magnetic disks, in order to avoid rotating parts and the generation of sparks, and in order to keep the dissipated electric power low. The computing capacity can especially be achieved through the use of a microprocessor. The graphics capability can especially be achieved by a graphics processor of its own or by a graphics card.

The data that goes to the data processing device is changed there according to the invention, at least partially, in that it undergoes computing operations and is compressed, at least partially; by the same token, it can undergo logical operations and/or format changes and/or be averaged and/or filtered there. This can apply, for example, especially to the data flow in the direction from the thin client terminal 1 to the computer C; according to a variant, this applies exclusively to the data flow in the direction from the thin client terminal 1 to the computer C.

According to the invention, the thin client terminal 1 is configured so as to be completely explosion-protected or intrinsically safe, that is to say, including all of the input and output devices 12, 13, 14, 15 and the data processing device 11, and can thus be used in the explosive area ExB. Preferably, the thin client terminal 1 can be operated at a low voltage up to 50V, for example, 12V or 24V, so that no high voltage that promotes the generation of sparks is needed to operate it.

Via preferably one single line K, which forms the data transmission channel K, the data processing device 11 is connected to the computer C that functions as the server with which the thin client terminal 1 is capable of communicating according to the client-server principle. The server C is arranged outside of the explosive area ExB in the so-called safe area SiB.

The data transmission via the line K is preferably a narrow-band transmission; in particular, advantageously, all of the components for data trans-mission between the data processing device 11 and the computer C can be configured right from the start to be narrow-band components.

The data or values supplied by the sensors S, as already was the case in the arrangement of FIG. 1, are carried via lines L to the computer C and processed in a certain manner there. Usually, in actually practice, the results or data derived from them should be displayed on the monitor 12, for example, in real time as a graphic, if applicable, as a function of inputs made via the keyboard 13, the mouse 14 or the barcode reader 15. This graphic can depict, for example, the momentary status of a system that is running in the explosive area and can additionally be, for instance, animated in order to facilitate the intuitive comprehension of the graphic content of a person who is operating or controlling the system.

In order to achieve this objective, in a conventional arrangement according to FIG. 1, all of the graphic data has to be generated by the computer C and sent to the monitor 12 at a ratio of 1:1. Especially at a high graphic resolution, great color depth and high time resolution, this entails an extremely large data flow from the server C to the thin client 1.

In contrast, by using the invention, the graphic data that is to be displayed can be generated—for instance, from relatively little data supplied by the server C, for example, via the data transmission channel K—only in the data processing device 11 itself and can then be sent, for example, via a short parallel cable to the monitor 12, whereby the graphic data obtained in this manner is considerably more extensive than the basic data supplied by the server C, in each case relative to the unit of time. The requisite data flow via the line K into the explosive area ExB is thus considerably reduced.

The program needed for this purpose in the data processing device 1 can be downloaded from the server C, for example, via the line K or via another channel.

The basic data can be, for example, compressed graphic data or purely numerical information, for example, pertaining to measured values, that serve as the basis for an extensive graphics representation that is to be generated by the data processing device 11 and displayed on the monitor 12. In comparison to the data volume received from the server C as the basic data, the graphic data generated by the data processing device from the basic data and output to the monitor can be, for example, more extensive by a factor of at least 10 to 100,000, in each case relative to the unit of time.

Through inputs made via the keyboard 13, the mouse 14 or the barcode reader 15 directly into the data processing device 1, an operator can choose, for example, among certain layout modes or other graphic options and can thus effectuate, for example, a renewed processing of the basic data by the data processing device 1, without another data flow via the line K being necessary for this purpose.

Figure 4:
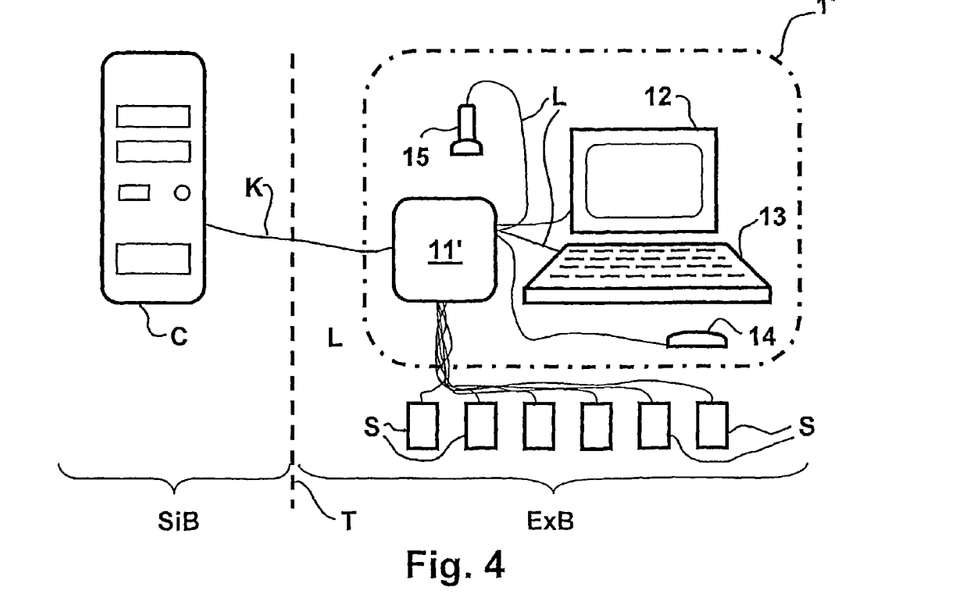

According to another embodiment of the invention, FIG. 4 shows a thin client terminal 1' according to the invention that differs from the thin client terminal 1 of FIG. 3 only in that, instead of the data processing device 11, it has a data processing device 11'. This, in turn, differs from the data processing device 11 of FIG. 3 only in that the data processing device 11' has additional interfaces for connecting the six sensors S. The six sensors S in FIG. 4—unlike the arrangements of FIG. 1 and FIG. 3—are not connected to the server C but instead directly to the data processing device 11'. The latter is connected to the server C via the line K.

According to one embodiment, the data processing device 11' first downloads from the server C via the line K a graphic and/or data processing program by means of which the data processing device 11' subsequently reads in the data stemming from the sensors S and, if applicable, from the input components (keyboard 13, mouse 14, barcode reader 15) and processes it into graphic data that is displayed on the monitor 13, without any further data exchange with the computer C taking place. The data flow via the line K is thus advantageously further reduced.

Moreover, it can be provided that the data or raw data supplied by the sensors S undergoes an evaluation and data reduction, for example, through averaging or other statistical procedures, and the reduced data thus obtained is stored for purposes of documentation outside of the explosive area ExB. In order to achieve this objective, with a conventional arrangement according to FIG. 1, all of the sensor data first has to be sent to the computer C; only there does the evaluation and data reduction take place.

In contrast, by using the invention, the data reduction can already be carried out locally in the thin client terminal 1' and only the reduced data is sent to the computer or server C, for example, via the line K. The data flow from the explosive area ExB to the server C, for example, via the line K, is thus considerably reduced in comparison to the flow of raw data, for example, by a factor of at least 10.

In actual practice, the invention can easily be used to reduce the data flow from the explosive area into the computer C or vice versa by a factor of 10,000 to 100,000.

INDUSTRIAL APPLICABILITY

The invention can be used industrially, for example, in the chemical, petrochemical and transportation sectors, in storage and in further processing as well as for the transportation of gas and oil as well as in the food sector.

LIST OF REFERENCE NUMERALS 1, 1' thin client terminal
11, 11' data processing device
12 monitor
13 keyboard
14 mouse
15 barcode reader
16 KVM interface
17 KVM interface
18 multiplex connection
C computer as server
ExB potentially explosive area
K data transmission channel
L lines
S sensors
SiB safe area
T partition between ExB and SiB

The invention claimed is:

1. A client server system with one server (C) and at least one thin client (1, 1') characterized in that the thin client is a thin client terminal (1,1') for use in an explosive area (ExB),
    having a data processing device (11, 11') having graphics capabilities that can be programmed by means of software and having its own storage and computing capacity, said device being connected through at least one data transmission channel (K) to a computer (C) that is not located in the explosive area (ExB) and that functions as a server, said device, as the thin client, being capable of communicating with the computer (C) according to the client-server principle
    and a display (12) connected to the data processing device (11, 11') for purposes of displaying data,
    whereby the thin client terminal (1, 1') is configured to be explosion-protected or intrinsically safe so that it can be used in the explosive area (ExB),
    and
    a) wherein the data processing device (11, 11') receives a certain maximum volume of basic data per unit of time from the server (C), and said device generates a volume of graphic data from this per unit of time and transmits it to the display (12), said data, averaged over time, being more extensive, here preferably averaged over time more extensive by a factor of at least 10, than the volume of basic data received per unit of time by the data processing device (11, 11') from the server (C),
    and/or
    b) wherein the thin client terminal (1, 1') also has
        a keyboard (13) that is configured to be explosion-protected or intrinsically safe and that is connected to the data processing device (11, 11'),
        and/or a barcode reader (15) that is configured to be explosion-protected or intrinsically safe,
        and/or a mouse (14) that is configured to be explosion-protected or intrinsically safe,
        and/or at least one other pointing device, for example, a trackball, finger mouse or touchpad, that is configured so as to be explosion-protected or intrinsically safe and that is connected to the data processing device for purposes of inputting data, and/or at least one sensor is connected to the data processing device (11, 11'), and wherein the data processing device (11, 11') receives a certain maximum volume of raw data per unit of time from the keyboard (13) and/or the mouse (14) and/or the barcode reader (15) and/or one or more sensors (S) connected to the data processing device (11'), wherein the device generates a volume of processed data from this per unit of time and transmits it to the server (C), said data volume being less extensive averaged over time, preferably less extensive by a factor of at least 10, than the volume of raw data received by the data processing device (11, 11') per unit of time.

2. The client server system according to claim 1, characterized in that the thin client terminal (1, 1') also has a keyboard (13) that is configured to be explosion-protected or intrinsically safe and that is connected to the data processing device (11, 11') for purposes of inputting data.

3. The client server system according to claim 1, characterized in that the thin client terminal (1, 1') has a barcode reader (15) that is configured to be explosion-protected or intrinsically safe and that is connected to the data processing device (11, 11') for purposes of inputting data.

4. The client server system according to claim 1, characterized in that the thin client terminal (1, 1') has a mouse (14) that is configured so as to be explosion-protected or intrinsically safe and that is connected to the data processing device (11, 11') for purposes of inputting data and/or it has at least one other pointing device, for example, a trackball, finger mouse or touchpad, that is configured so as to be explosion-protected or intrinsically safe and that is connected to the data processing device for purposes of inputting data.

5. The client server system according to claim 1, characterized in that the data processing device (11, 11') has a microprocessor or a microcontroller.

6. The client server system according to claim 1, characterized in that the clock frequency of the microprocessor or microcontroller is less than 5 gigahertz or less than 2 gigahertz or less than 1 gigahertz or less than 800 megahertz or less than 100 megahertz.

7. The client server system according to claim 1, characterized in that the data processing device (11, 11') has its own graphics processor.

8. The client server system according to claim 1, characterized in that the display (12) is a flat monitor (12) that is configured so as to be explosion-protected or intrinsically safe.

9. The client server system according to claim 1, characterized in that the display (12) is a touch screen that is configured so as to be explosion-protected or intrinsically safe, via which data can be input into the data processing device (11, 11').

10. The client server system according to claim 1, characterized in that the data processing device (11, 11') has at least one memory chip or other type of memory without a magnetic disk.

11. The client server system according to claim 1, characterized in that the entire thin client terminal (1, 1') can be operated at a low voltage of 24 volts or less.

12. The client server system according to claim 1, characterized in that the data processing device (11') has at least one interface for the connection of a sensor (S).

13. The client-server system according to claim 1, characterized in that the data transmission channel (K) is a DSL or ISDN line or it has at least one asynchronous serial interface.

14. The client-server system according to claim 1, characterized in that the data transmission channel (K) allows a maximum data transmission rate between 100 kilobits per second and 100 megabits per second, preferably 115,200 bits per second, or between 1 megabit and 8 megabits per second.

15. The client-server system according to claim 1, characterized in that several thin client terminals (1, 1') are connected to the server (C).

16. The client-server system according to claim 1, characterized in that the data processing device (11') and the computer (C) are capable of communicating in at least one direction by means of a multiplex signal.

17. A method for processing and displaying of data in an explosion endangered region characterized in that a thin client terminal (1, 1')

which is configured so as to be completely explosion-protected or intrinsically safe including all of the input and output devices (12, 13, 14, 15) and is operated in the explosion endangered area (ExB), a data processing device (11, 11') having graphics capabilities that can be programmed by means of software and having its own storage and computing capacity, and a display connected to the data processing device (11, 11') for purposes of displaying data, a computer (C) not disposed in the explosion endangered region and operated as a server, wherein the data processing device (11, 11') is connected according to the client-server principle through at least one data transmission channel to the computer (C) that is not located in the explosive area and that functions as a server, and a) wherein the data processing device (11, 11') receives a certain maximum volume of basic data per unit of time from the server (C), and said device generates a volume of graphic data from this per unit of time and transmits it to the display (12), said data, averaged over time, being more extensive, here preferably averaged over time more extensive by a factor of at least 10, than the volume of basic data received per unit of time by the data processing device (11, 11') from the server (C), and/or b) wherein the thin client terminal (1, 1') also has a keyboard (13) that is configured to be explosion-protected or intrinsically safe and that is connected to the data processing device (11, 11'), and/or a barcode reader (15) that is configured to be explosion-protected or intrinsically safe, and/or a mouse (14) that is configured to be explosion-protected or intrinsically safe, and/or at least one other pointing device, for example, a trackball, finger mouse or touchpad, that is configured so as to be explosion-protected or intrinsically safe and that is connected to the data processing device for purposes of inputting data, and/or at least one sensor is connected to the data processing device (11, 11'), and wherein the data processing device (11, 11') receives a certain maximum volume of raw data per unit of time from the keyboard (13) and/or the mouse (14) and/or the barcode reader (15) and/or one or more sensors (S) connected to the data processing device (11'), wherein the device generates a volume of processed data from this per unit of time and transmits it to the server (C), said data volume being less extensive averaged over time, preferably less extensive by a factor of at least 10, than the volume of raw data received by the data processing device (11, 11') per unit of time.

18. The method according to claim 17
wherein the data transmitted via the data transmission channel consists at least partially of data that only relates to the change of an already existing status, for example, a certain screen layout,
wherein such data does not contain the complete information for creating a certain status such as, for instance, a certain screen layout, but rather only the much less comprehensive information relating to a pure change or updating of the existing status.

19. The method according to claim 17
wherein the graphic data delivered by the server (C) to be shown on the display are only generated in the data processing device (11, 11'), wherein the graphic data obtained in this way are more voluminous as the base data delivered by the server (C) in each case relative to a unit of time.

20. A client server system comprising
an explosion endangered area (ExB);
a safe area (SiB) disposed outside of the explosion endangered area (ExB);
a server (C) disposed in the safe area (SiB);
a data processing device (11, 11') disposed in the explosion endangered area (ExB) and having graphics capabilities that are programmed by means of software and having its own storage and computing capacity;
a data transmission channel (K) explosion protected or intrinsically safe and connecting the data processing device (11,11') to the server (C) for furnishing data transmission between the data processing device (11, 11') and the server (C) according to a client-server principle;
a display (12) disposed in the explosion endangered area (ExB) and connected to the data processing device (11, 11') for displaying data delivered by the data processing device (11, 11') to the display (12) and wherein the data processing device (11, 11') and the display (12) form a thin client terminal (1,1');
wherein the thin client terminal (1, 1') is configured to be explosion-protected or intrinsically safe so that it is useable in the explosion endangered area (ExB);
a data input device (13, 14, 15, S) disposed in the explosion endangered area (ExB), that is configured to be explosion-protected or intrinsically safe,
and connected to the data processing device (11, 11') through an explosion protected or intrinsically safe line (L) with the purpose of inputting data to the data processing device (11, 11');
wherein a volume of inputted data delivered by the data input device (13, 14, 15, S) to the data processing device (11, 11') is less extensive when averaged over time than the client data delivered from the data processing device (11, 11') to the server (C).

21. A method for processing and displaying of data in an explosion endangered region comprising
defining an explosion endangered area (ExB);
defining a safe area (SiB) disposed outside of the explosion endangered area (ExB);
disposing a server (C) in the safe area;
disposing a data processing device (11, 11') in the explosion endangered area (ExB);
furnishing graphics capabilities to the data processing device (11, 11');
programming the graphics capabilities by means of software;
furnishing its own storage and computing capacity to the data processing device (11, 11');
connecting the data processing device (11,11') to the server (C) through a data transmission channel (K) which is explosion protected or intrinsically safe and for furnishing data transmission between the data processing device (11, 11') and the server (C) according to a client-server principle;
disposing a display (12) in the explosion endangered area (ExB);
connecting the display (12) to the data processing device (11, 11');
displaying data delivered by the data processing device (11, 11') to the display (12) and wherein the data processing device (11, 11') and the display (12) form a thin client terminal (1,1');
configuring the thin client terminal (1, 1') to be explosion-protected or intrinsically safe so that it is useable in the explosion endangered area (ExB);
disposing a data input device (13, 14, 15, S) in the explosion endangered area (ExB), that is configured to be explosion-protected or intrinsically safe;
connecting the data input device (13, 14, 15, S) to the data processing device (11, 11') through an explosion protected or intrinsically safe line (L);
inputting data to the data processing device (11, 11');
wherein a volume of inputted data delivered by the data input device (13, 14, 15, S) to the data processing device (11, 11') is less extensive when averaged over time than client data delivered from the data processing device (11, 11') to the server (C).

\* \* \* \* \*